Oct. 11, 1966   W. D. BEHLEN   3,277,812
MATERIAL STORAGE MEANS
Filed Dec. 20, 1963

INVENTOR
WALTER D. BEHLEN
By Duck & Zarley
ATTORNEYS

United States Patent Office 3,277,812
Patented Oct. 11, 1966

3,277,812
MATERIAL STORAGE MEANS
Walter D. Behlen, Columbus, Nebr., assignor to Behlen Manufacturing Company, Inc., Columbus, Nebr., a corporation of Nebraska
Filed Dec. 20, 1963, Ser. No. 332,122
5 Claims. (Cl. 99—235)

This invention relates to material storage bins of the sealed type, and more particularly to the handling of carbon dioxide given off by the material stored that accumulates in the upper portion of the storage bins.

The general idea of sealed storage bins which have gas expansion means is old. Heretofore, however, such devices have had several drawbacks. One such drawback was that the expansion chambers were sometimes constructed as an integral part of the storage bin, thus undesirably complicating the storage structure. Another such drawback is that the expansion chambers when not integral with the storage bin required a separate structure. Another such drawback was that the separate expansion chambers permitted undesirable convection currents to be created.

Therefore, one the principal objects of the invention is to provide a structure incorporating a sealed storage bin and attendant gas expandable means which prevents carbon dioxide from escaping into the atmosphere.

A further object of the invention is to provide a gas expandable means which prevents convection currents from being created.

A still further object of the invention is to provide a structure which is uncomplicated in design and is automatic in operation.

A still further object of the invention is to provide a separate gas expansion chamber which does not necessarily require a separate enclosure means.

A still further object of the invention is to provide an insulating material within the expansion chamber which retards the movement of gases therein.

A still further object of the invention is to provide a gas expandable means for sealed housings that is economical in manufacture and durable in use.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 1:
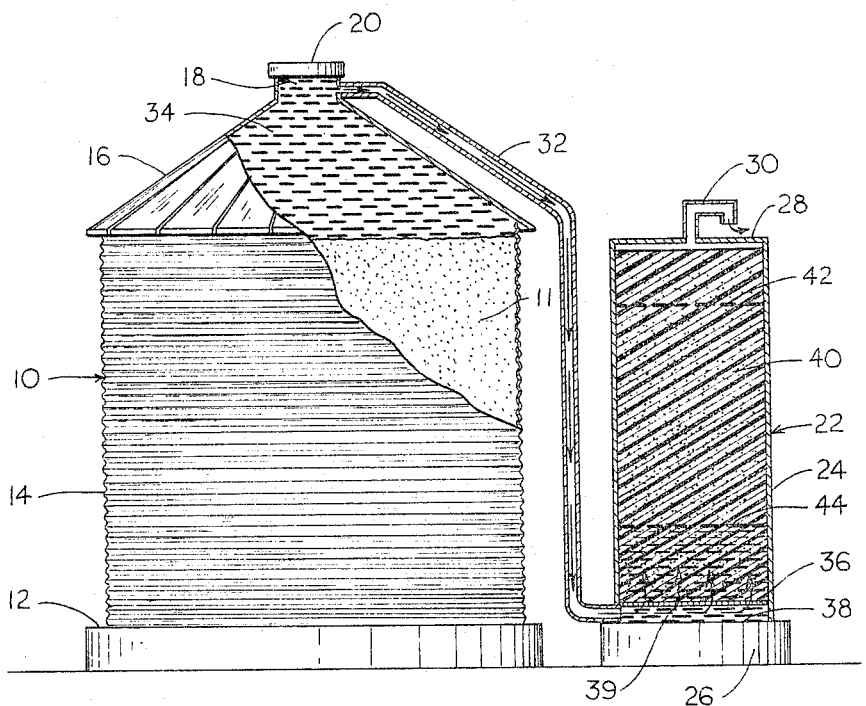
FIG. 1 is a side view of the device in use showing the expansion phase and with sections cut away to more fully illustrate its construction.

In the drawings, the numeral 10 generally designates a common sealed grain storage bin of standard configuration, having a base 12, vertical cylindrical sides 14, and a conical top portion 16. Grain 11 is stored within storage bin 10 and is placed therein through the usual top opening 18 and such opening is sealed by lid 20. Grain 11 as associated with this device is of the variety that gives off carbon dioxide during storage such as feeds, silage, etc.

Separate from and in spaced relation to the storage bin 10 is a vertical container 22 having vertical cylindrical sides 24, base 26 and top 28. Top 28 is provided with a vent means 30. A conduit pipe 32 has one end in communication with the inside top area 34 of the interior of the storage bin 10 and its other end communicating with the inside and into the bottom area of the interior of the vertical container 22. FIG. 1 shows a horizontal perforated plate 36 secured to the inner walls of vertical container 22 and in a spaced relation to the bottom 28 of container 22 thereby forming open space 39. This horizontal plate 36 is optional and may or may not be utilized. Vertical container 22 contains therein an open cell foam insulative material 40 such as urea formaldehyde foam. The numeral 42 generally designates a level that the carbon dioxide will attain at its maximum expansion. The numeral 44 generally designates a level that the carbon dioxide will reach when at its maximum contraction.

Figure 2:
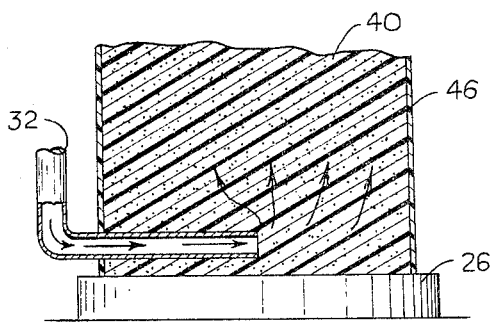
FIG. 2 is a fragmentary side view of the device illustrating an alternative method of constructing the expansion chamber.
Figure 3:
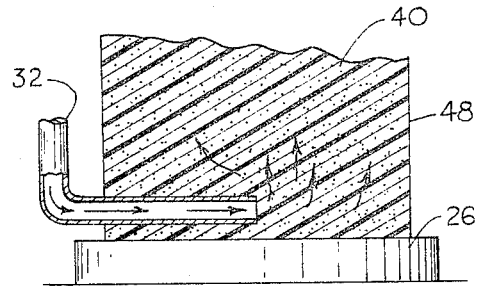
FIG. 3 is a fragmentary side view of the device illustrating an alternative method of constructing the expansion chamber.

FIG. 2 illustrates a variation of the structure wherein a conduit pipe 32 is in communication with the lower inside area of a column of open cell insulative foam material 40. A layer of closed cell insulative foam material 46 surrounds the vertical side portions of the column comprised of material 40. FIG. 3 illustrates a further variation of the structure wherein a conduit pipe 32 is in communication with the lower inside area of a column of open cell insulative foam material 40. Any suitable material is merely intended to act as a stabilizing agent to hold the insulative material in place.

The normal operation of the device is as follows. Carbon dioxide will be formed by the material 11 stored in storage bin 10. As the carbon dioxide expands the gas will pass from inside area 34 of bin 10 through conduit pipe 32 into the inside bottom area of vertical container 22. As illustrated in FIG. 1, a horizontal plate 36 is in a spaced relation with bottom 38 of container 22 thereby creating an open space 39 therein. As the carbon dioxide enters the bottom of container 22 the gas will immediately fill the open space 39. When open space 39 is filled with the carbon dioxide, the gas will then gradually move upwardly into the open cell foam insulative material 40. While a closed cell foam insulative material usually is the best insulative substance an open cell foam substance such as urea formaldehyde foam works extremely well due to its small cell size. As the carbon dioxide is generated or expanding, the gas in the vertical container 22 will move upwardly in a horizontal plane. When the gas has reached its maximum expansion the height of the carbon dioxide in container 22 will be approximately at level 42. As the gas contracts during the night or cooler periods the height of the carbon dioxide will be approximately at level 44. Vent means 30 are provided to allow excess air or carbon dioxide to escape into the atmosphere if necessary.

FIG. 2 illustrates an alternative method of constructing an expansion chamber wherein a column of open cell foam insulative material 40 has its sides enclosed by a thin layer of closed cell foam insulative material 46. The layer of closed cell material 46 prevents any possibility of undesirable convection currents being created within material 40. Although the drawings do not illustrate it an alternate expansion chamber is possible by inserting the structure of FIG. 2 within vertical container 22 in FIG. 1.

FIG. 3 illustrated an alternative method of constructing an expansion chamber wherein a column of open cell foam material 40 is enclosed by a thin layer of suitable material, such as plastic or the like, merely to retain the foam material 40 in position. It is also possible to omit the thin cover 48 from this structure having only a column of open cell material 40 as the expansion chamber.

It has been found that urea formaldehyde foam is the most satisfactory open cell foam substance for the device. Any type of the closed foam substances that are commonly available on the market today will work satisfactorily in the instances where such substances are to be utilized.

Thus from the foregoing it can be seen that the device will accomplish at least all of its stated objectives.

Some changes may be made in the construction and arrangement of my material storage means without departing from the real spirit and purpose of my invention, and it is my intention to cover by my claims, any modified forms of structure or use of mechanical equivalents which may be reasonably included within their scope.

I claim:

1. In a material storage and preserving means, comprising in combination,
a closable material storage container,
a vertical container having its inside upper area in communication with the outside atmosphere,
and a conduit having one end communicating with the inside top area of said storage container, and its other end communicating with the inside bottom area of said vertical container,
said vertical container having an open cell insulative foam material therein,
and a layer of closed cell insulative foam material between said open cell insulative material and the inside vertical walls of said vertical container.

2. In a material storage and preserving means, comprising in combination,
a closable material storage container,
a vertical container having its inside upper area in communication with the outside atmosphere,
a conduit having one end communicating with the inside top area of said storage container, and its other end communicating with the inside bottom area of said vertical container,
said vertical container having an open cell urea formaldehyde foam insulative material therein,
and a layer of closed cell foam insulative material between said open cell insulative material and the inside walls of said vertical container.

3. In a material storage and preserving means, comprising in combination,
a closable material storage container,
a vertical container having its inside upper area in communication with the outside atmosphere,
a conduit having one end communicating with the inside top area of said storage container, and its other end communicating with the inside bottom area of said vertical container,
said vertical container having a perforated horizontal plate rigidly secured to the inside walls of said vertical container in a vertically spaced relation with the bottom of said vertical container,
said vertical container having an open cell urea formaldehyde foam insulative material therein above said horizontal plate,
and a layer of closed cell foam insulative material between said open cell insulative material and the inside walls of said vertical container,
said end of said conduit which communicates with the inside bottom area of said vertical container communicates therewith at a position below said horizontal plate.

4. In a material storage and preserving means, comprising in combination,
a closable material storage container,
a column of open cell foam insulative material,
a conduit having one end communicating with the inside top area of said storage container, and its other end communicating with the inside bottom area of said column,
and a layer of closed cell foam insulative material on the outside surface of the walls of said column.

5. In a material storage and preserving means, comprising in combination,
a closable material storage container,
a column of open cell urea formaldehyde foam insulative material,
a conduit having one end communicating with the inside top area of said storage container, and its other end communicating with the inside bottom area of said column,
and a layer of closed cell foam insulative material on the outside surface of the walls of said column.

References Cited by the Examiner

UNITED STATES PATENTS

| 1,526,147 | 2/1925 | Holken | 99—235 |
| 1,541,147 | 6/1925 | Ikeda et al. | |
| 1,947,586 | 2/1934 | Fletcher | 138—42 |
| 2,559,891 | 7/1951 | Meyer | 260—71 X |
| 2,662,379 | 12/1953 | Reich | 206—7 X |
| 3,165,054 | 1/1965 | Behlen et al. | 99—235 |

FOREIGN PATENTS 921,175  3/1963  Great Britain.

WALTER A. SCHEEL, *Primary Examiner.*

WILLIAM I. PRICE, *Examiner.*

CLYDE I. COUGHENOUR, *Assistant Examiner.*